United States Patent
Hansson et al.

(10) Patent No.: US 11,851,118 B2
(45) Date of Patent: Dec. 26, 2023

(54) STEERING SYSTEM MONITORING

(71) Applicant: Volvo Car Corporation, Gothenburg (SE)

(72) Inventors: Anders Hansson, Torslanda (SE); Carl-Johan Häll, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 246 days.

(21) Appl. No.: 16/717,766

(22) Filed: Dec. 17, 2019

(65) Prior Publication Data
US 2020/0189651 A1 Jun. 18, 2020

(30) Foreign Application Priority Data

Dec. 17, 2018 (EP) .................................... 18213047

(51) Int. Cl.
*B62D 5/04* (2006.01)
*B62D 5/00* (2006.01)
(Continued)

(52) U.S. Cl.
CPC .......... *B62D 5/0493* (2013.01); *B62D 5/006* (2013.01); *B62D 5/0481* (2013.01);
(Continued)

(58) Field of Classification Search
CPC .... B62D 5/0493; B62D 5/0481; B62D 5/006; B62D 5/0487; B62D 19/00; G05D 1/021; G01L 1/22
See application file for complete search history.

(56) References Cited

U.S. PATENT DOCUMENTS 5,440,487 A * 8/1995 Althoff .................. G06F 11/00
180/404
5,521,820 A * 5/1996 Wakamatsu ........... B62D 5/046
701/42
(Continued)

FOREIGN PATENT DOCUMENTS

DE          10347179 A1    5/2005
DE     102011008337 A1    7/2012
(Continued)

OTHER PUBLICATIONS

1A Auto, Power Steering 101, Apr. 26, 2016, 1aauto.com, pp. 1 (Year: 2016).*
(Continued)

*Primary Examiner* — Aniss Chad
*Assistant Examiner* — Chase L Cooley
(74) *Attorney, Agent, or Firm* — Shumaker & Sieffert, P.A.

(57) ABSTRACT

The disclosure relates to a method including the steps of: acquiring a time sequence of sets of vehicle parameter values; determining, for each set of acquired vehicle parameter values, based the set of acquired vehicle parameter values, a measure indicative of an observed strain in a steering rod, between a steering actuator and a wheel; determining, for each set of acquired vehicle parameter values, a measure indicative of a predicted strain in the rod, between the steering actuator and the wheel; and determining the functional status of the steering system based on a relation between the measures indicative of the observed strain in the rod and the measures indicative of the predicted strain in the rod.

20 Claims, 5 Drawing Sheets

(51) Int. Cl.
B62D 19/00 (2006.01)
G05D 1/02 (2020.01)
G01L 1/22 (2006.01)

(52) U.S. Cl.
CPC ........... B62D 5/0487 (2013.01); B62D 19/00 (2013.01); G05D 1/021 (2013.01); *G01L 1/22* (2013.01)

(56) References Cited

U.S. PATENT DOCUMENTS

| | | | |
|---|---|---|---|
| 6,803,736 B1 | 10/2004 | Hommel et al. | |
| 2016/0280258 A1* | 9/2016 | Lavoie | B62D 5/0481 |
| 2019/0241211 A1* | 8/2019 | Dagli | B62D 5/0481 |
| 2020/0156634 A1* | 5/2020 | Jeong | G08G 1/167 |

FOREIGN PATENT DOCUMENTS

| | | |
|---|---|---|
| DE | 102014107914 A1 | 12/2015 |
| WO | 2018/093587 A1 | 5/2018 |

OTHER PUBLICATIONS

Akira Noguchi, Kosuke Yamawaki, Toshiro Yamamoto and Tomoaki Toratani "Development of a Steering Angle and Torque Sensor of Contact-Type" 2004, Furukawa Review, No. 25, pp. 36 and 41 (Year: 2004).*
Communication with extended European Search Report from counterpart European Application No. 18213047.6, dated Jun. 28, 2019, 8 pp.

\* cited by examiner

STEERING SYSTEM MONITORING

CROSS REFERENCE

This application claims priority to European application no. 18213047.6 filed 17 Dec. 2018, the entire contents of which are incorporated herein by reference.

FIELD OF THE INVENTION

The present invention relates to a method of determining a functional status of a steering system of a vehicle, to a steering system monitoring unit, and to a vehicle.

BACKGROUND

The functional status of a steering system of a vehicle can be influenced by various factors, including, for example, increased friction in joints and/or gears of the steering system, deformed or otherwise damaged components of the steering system, a damaged wheel suspension, or play in the steering system due to mechanical wear.

The ability to reliably detect a degraded functional status of the steering system of a vehicle may be of particular importance for vehicles with autonomous drive capabilities. When operating autonomously, the senses of a driver cannot be relied upon to detect a degraded functional status of the steering system.

SUMMARY

In view of the above, it is an object to provide for reliable determination of a functional status of a steering system of a vehicle.

According to a first aspect, it is therefore provided a method of determining a functional status of a steering system of a vehicle, the steering system including a wheel, and a rod coupled to the wheel and arranged to turn the wheel under the control of a steering actuator operable to apply an actuation force to the rod, the method including the steps of: acquiring a time sequence of sets of vehicle parameter values, each set of vehicle parameter values including a first parameter value indicative of a desired direction of travel of the vehicle, a second parameter value indicative of a vehicle speed, and a third parameter value indicative of the actuation force currently applied by the steering actuator to the rod; determining, for each set of acquired vehicle parameter values, based on the set of acquired vehicle parameter values, a measure indicative of an observed strain in the rod, between the steering actuator and the wheel, resulting in a time sequence of measures indicative of the observed strain in the rod; determining, for each set of acquired vehicle parameter values, based on previously determined measurement values indicative of strain values for different vehicle parameter values, a measure indicative of a predicted strain in the rod, between the steering actuator and the wheel, resulting in a time sequence of measures indicative of the predicted strain in the rod; and determining the functional status of the steering system based on a relation between the time sequence of measures indicative of the observed strain in the rod and the time sequence of measures indicative of the predicted strain in the rod.

According to a second aspect, it is provided a steering system monitoring unit, for monitoring a functional status of a steering system including a wheel, and a rod coupled to the wheel and arranged to turn the wheel under the control of a steering actuator operable to apply an actuation force to the rod, the steering system monitoring unit being configured to: acquire a time sequence of sets of vehicle parameter values, each set of vehicle parameter values including a first parameter value indicative of a desired direction of travel of the vehicle, a second parameter value indicative of a vehicle speed, and a third parameter value indicative of the actuation force currently applied by the steering actuator to the rod; determine, for each set of acquired vehicle parameter values, based on the set of acquired vehicle parameter values, a measure indicative of an observed strain in the rod, between the steering actuator and the wheel, resulting in a time sequence of measures indicative of the observed strain in the rod; determine, for each set of acquired vehicle parameter values, based on previously determined measurement values indicative of strain values for different vehicle parameter values, a measure indicative of a predicted strain in the rod, between the steering actuator and the wheel, resulting in a time sequence of measures indicative of the predicted strain in the rod; and determine the functional status of the steering system based on a relation between the time sequence of measures indicative of the observed strain in the rod and the time sequence of measures indicative of the predicted strain in the rod.

BRIEF DESCRIPTION OF THE DRAWINGS

These and other aspects will now be described in more detail, with reference to the appended drawings showing an example embodiment, wherein.

DETAILED DESCRIPTION OF EXAMPLE EMBODIMENTS

Figure 1:
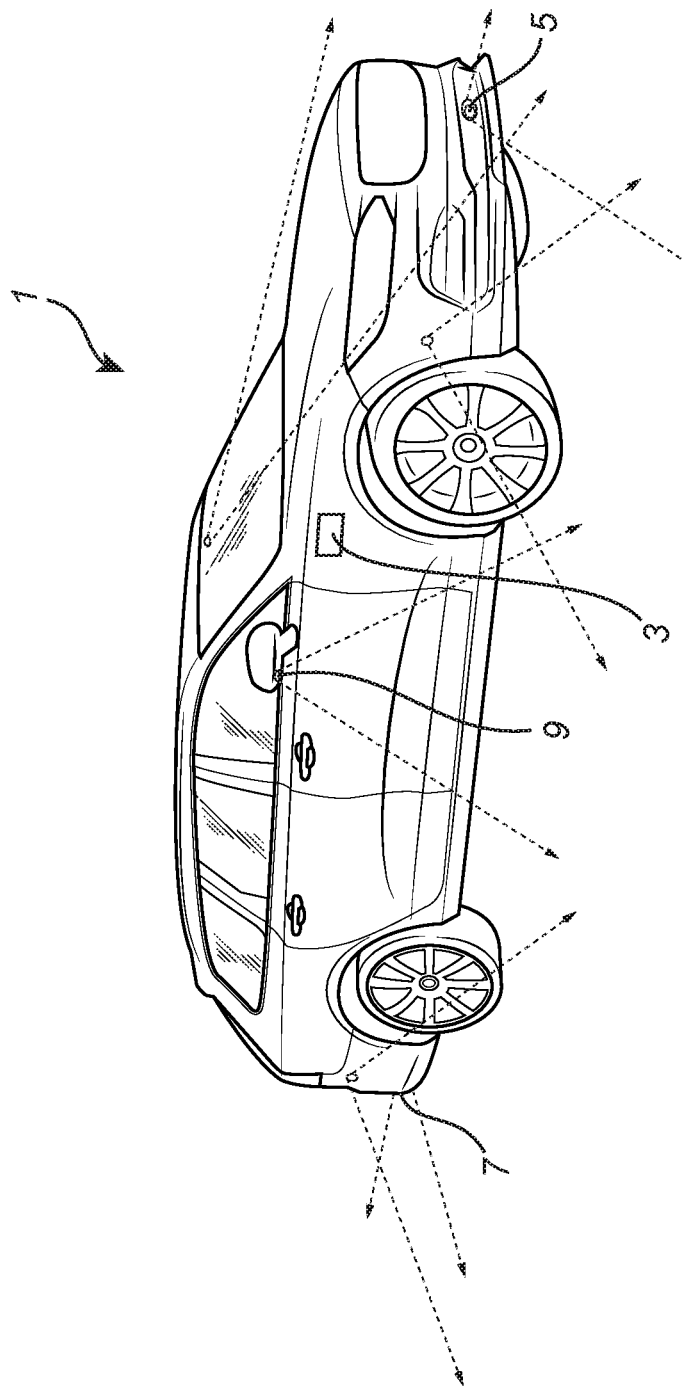
FIG. 1 schematically shows a vehicle according to an example embodiment.

FIG. 1 schematically shows a vehicle, here in the form of a vehicle 1, according to an example embodiment. The vehicle 1 in FIG. 1 is capable of autonomous drive operation and includes an autonomous drive controller 3, and a plurality of sensing systems. The sensing systems may include various types of sensors, such as a front view optical sensor 5, a reverse camera 7, a rearview mirror camera 9, and various other types of sensors sensing electromagnetic radiation (for example light or radar signals), or acoustic signals etc.

The present disclosure is based on the realization that by comparing an observed strain in the rod acting on the steerable wheel(s) with a predicted strain for the steering system over time, it can be reliably detected if the observed strain deviates from the predicted strain. Based on this detection, conclusions can be drawn about the functional status of the steering system of the vehicle. In particular, the present disclosure realizes that observations and predictions of the strain in the rod coupling the steerable wheel(s) to the steering actuator can provide more accurate and reliable information about the functional status of the steering system than is achievable by monitoring the actuation force provided by the steering actuator, or a torque corresponding to the actuation force. The actuation force, or corresponding torque, depends on the command currently issued to the steering actuator, while the strain in the rod between the steering actuator and the wheel additionally depends on the functional status of the steering system, such as friction or play etc, and on the friction between the wheel(s) and the road etc.

In the following, various embodiments will be described. All of these embodiments rely on the above realization and provide the same or similar advantageous effects.

Figure 2:
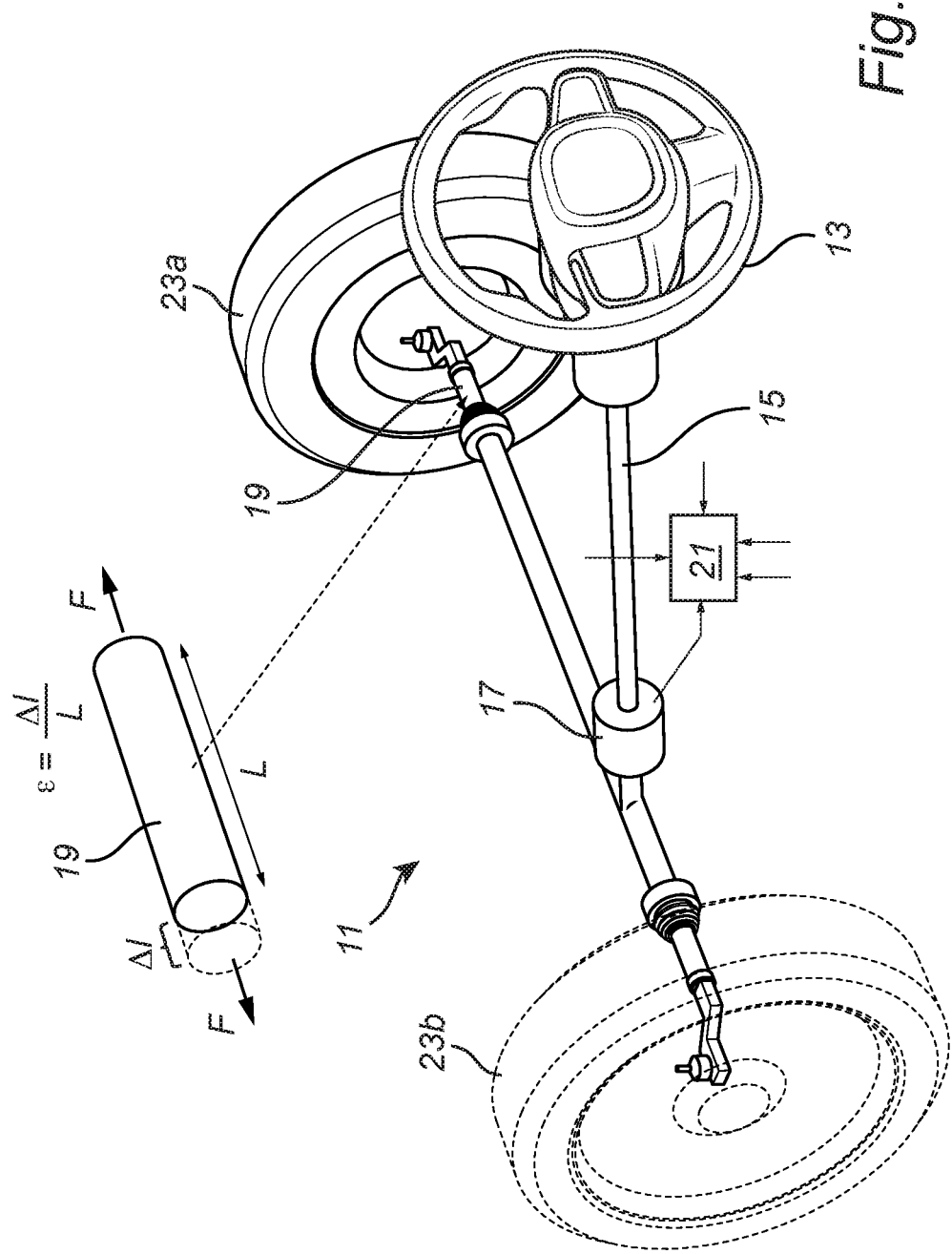
FIG. 2 schematically shows a steering system included in the vehicle in FIG. 1.

FIG. 2 schematically shows a steering system, including a steering system monitoring unit according to an example embodiment.

Referring to FIG. 2, the exemplary steering system 11 includes a steering wheel 13, a steering shaft 15, a steering actuator 17, a steering rod 19, and a steering system monitoring unit 21. As is schematically shown in FIG. 2, the steering rod 19 is coupled to the front wheels 23a-b of the vehicle 1, and to the steering actuator 17 in such a way that the steering actuator 17 is operable to apply an actuation force to the steering rod 19.

As is, per se, well known to one of ordinary skill in the art, the steering actuator 17 may, for example, be an electric motor that may be controlled to provide a requested actuation torque. The requested actuation torque may be converted to the above-mentioned actuation force using a known mechanical conversion arrangement, such as a rack-and-pinion arrangement. This mechanical conversion arrangement is not explicitly shown in FIG. 2.

The actuation force requested by the steering actuator 17 (for example the actuation torque requested by an electric steering motor) may be determined based on various input indicating a desired direction of travel and/or a desired change in the direction of travel of the vehicle. When the vehicle 1 is in the autonomous drive mode, the autonomous drive controller 3 may continuously determine which actuation force to request from the steering actuator 17 based on, for example, the current desired direction of travel, the speed of the vehicle, and a functional model of the vehicle. When the vehicle 1 is in manual drive mode, the requested actuation force may be determined based on, for example, the rotational angle of the steering wheel 13, the speed of the vehicle, and a functional model of the vehicle.

When the steering actuator 17 is controlled to apply an actuation force to the steering rod 19 this will result in a strain ε in the steering rod 19 that depends on the actuation force, the properties of the suspension system, the friction between tires and road, the speed of the vehicle, friction in the steering system 11, etc. The strain ε in the steering rod 19 is schematically illustrated in FIG. 2. As is well known, the strain is directly proportional to the stress in the elastic range of a material. Accordingly, the strain in the steering rod 19 is an indication of the total elongating or compressing force acting on the steering rod 19. This, of course, means that each of the force and the stress is a measure indicative of the strain in the steering rod 19.

The steering system monitoring unit 21 is schematically indicated in FIG. 2 as receiving various input signals. An example embodiment of the steering monitoring unit 21 will now be described with reference to the schematic block diagram in FIG. 3.

Figure 3:
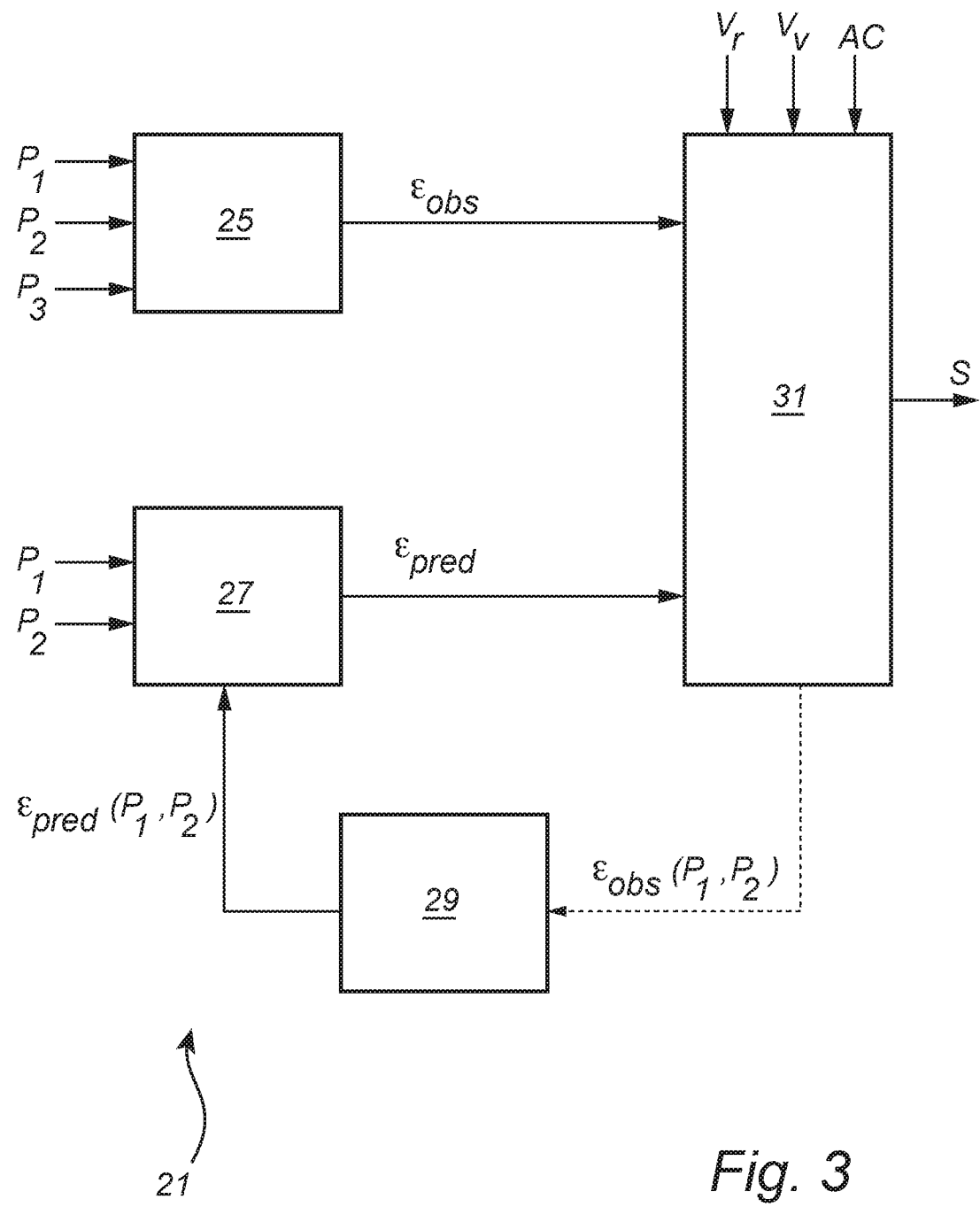
FIG. 3 is a block diagram of a steering system monitoring unit according to an example embodiment.

Referring to FIG. 3, the steering system monitoring unit 21 comprises an observer module 25, a predictor module 27, a steering rod strain database 29, and a status determining module 31. As is indicated in FIG. 3, the observer module 25 acquires values of the parameters P1, P2, P3. The output from the observer module 25 is a time sequence of values indicative of the observed strain εobs, determined based on the acquired values of the parameters P1, P2, P3. The predictor module 27 acquires values of the parameters P1, P2, and accesses, from the rod strain database 29, previously determined measurement values indicative of the strain εpred in the steering rod 19 of a steering system 11 with a known good functional status, based on the acquired values of the parameters P1, P2. The output from the predictor module 27 is a time sequence of predicted strain values εpred for a known good functional status of the steering system 11.

The time sequence of values indicative of the observed strain εobs, and the time sequence of values indicative of the predicted strain εpred are provided to the status determining module 31, which determines, based on a relation between the observed strain εobs and the predicted strain εpred, the value of a status parameter S that is an indication of the functional status of the steering system 11. The value of the status parameter S is provided by the steering system monitoring unit 21, and may be used for controlling operation of the vehicle 1. For instance, the autonomous drive controller 3 may issue a warning and switch the vehicle 1 to manual control based on a value of the status parameter S indicating a degraded functional status of the steering system 11. More detail about the operation of the steering system monitoring unit 21 will be provided below with reference to the flow-charts in FIG. 4 and FIG. 5.

It should be understood that the steering system monitoring unit 21 may be implemented in software, hardware, or a combination of software and hardware. The steering system monitoring unit 21 may represent computing hardware that is implemented locally within the vehicle 1, or may represent computing hardware that is implemented externally to the vehicle 1, or may represent a combination of computing hardware that is distributed between the vehicle 1 and an external location. For example, the steering system monitoring unit 21 may be included in a server device or a server system that provides cloud-based computing functionalities with respect to the vehicle 1 and optionally, other vehicles. Server systems that may implement the steering system monitoring unit 21 include consolidated server systems and/or distributed server systems. In these examples, computing hardware of the vehicle 1 (e.g., the autonomous drive controller 3) may invoke telemetry hardware of the vehicle 1 to transmit input parameters such as the observed εobs and εpred values or series thereof to the server system implementing the functionalities ascribed to the steering system monitoring unit 21 in this disclosure. In these examples, the autonomous drive controller 3 may receive the functional status of the steering system 11 from the server device or server system via the telemetry hardware of the vehicle 1.

Figure 4:
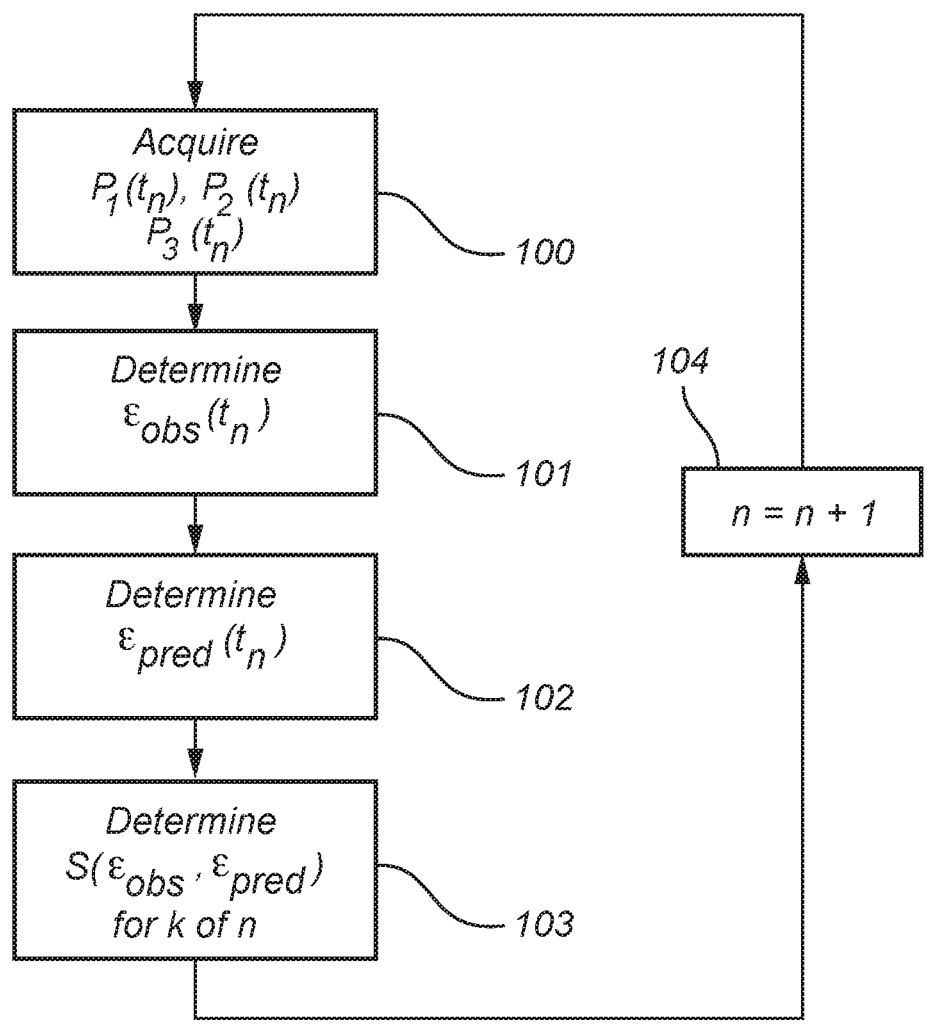
FIG. 4 is a flow-chart illustrating a method according to a first example embodiment.

FIG. 4 is a flow-chart illustrating a method according to a first example embodiment. In a first step 100, a set of vehicle parameter values is acquired at a time tn by the steering system monitoring unit 21. The set of vehicle parameter values includes a first parameter value P1($tn$) indicative of a desired change in direction of the vehicle 1, a second parameter value P2($tn$) indicative of a vehicle speed, and a third parameter value P3($tn$) indicative of the actuation force currently applied by the steering actuator 17 to the steering rod 19.

Based on the acquired vehicle parameter values, P1($tn$), P2($tn$) and P3($tn$), a measure indicative of an observed strain εobs($tn$) in the steering rod 19 is determined in step 101. The observed strain εobs(tn) (or any other measure indicative thereof) may be determined based on a predefined vehicle model of the individual vehicle 1.

A measure indicative of a predicted strain $\varepsilon pred(tn)$ in the steering rod 19 is determined in step 102 based on previously determined measurement values indicative of strain values for different vehicle parameters. Such previously determined measurement values may be stored in the steering rod strain database 29.

The previously determined measurement values indicative of the strain in the steering rod 19 of a steering system with known good functional status may have been previously determined in various ways. According to one example embodiment, the previously determined measurement values may originate from measurements using physical measurement equipment, such as a strain gauge, carried out on a test vehicle with an identically or similarly configured steering system. According to another example embodiment, the previously determined measurement values may originate from model-based observations carried out when the vehicle was new. These embodiments may also be combined. For instance, a basic lookup table (LUT) (the steering rod strain database 29) may be configured using measurements carried out on a test vehicle, and then the LUT may be expanded using observed values exhibiting sufficiently small deviations from interpolations of values already in the LUT.

In the subsequent step 103, a value of a status parameter $S(\varepsilon obs, \varepsilon pred)$ is determined for a time-sequence of sets of vehicle parameter values $P1(tn)$, $P2(tn)$, $P3(tn)$. The sequence of sets may include all (n) acquired sets, or a subset (k) of the acquired sets. The value of the parameter $S(\varepsilon obs, \varepsilon pred)$ may be determined based on a relation between the time sequence of measures indicative of the observed strain $\varepsilon obs(tn)$, and the time sequence of measures indicative of the predicted strain $\varepsilon pred(tn)$.

According to one example embodiment, the functional status parameter S may be an indication of a cumulative deviation over time between the observed strain $\varepsilon obs(tn)$ in the steering rod 19, and the predicted strain $\varepsilon pred(tn)$ in the steering rod 19. When the value of the functional status parameter S becomes greater than a predefined threshold value for a predefined number of vehicle parameter acquisitions, it may be determined, by the status determining module 31 or other circuitry outside the steering system monitoring unit 21, that the functional status of the steering system 11 has been degraded. According to another example embodiment, different observed strain values $\varepsilon obs(tn)$ may be assigned to different predefined categories or "bins" depending on the magnitude of the deviation of the individual observed strain values and the corresponding predicted strain values. When the number of observations in a given category or bin becomes greater than a predefined number, it may be determined, by the status determining module 31 or other circuitry outside the steering system monitoring unit 21, that the functional status of the steering system 11 has been degraded.

The counter n may then be incremented by one in step 104, before the method returns to the first step 100 to acquire a new set of vehicle parameter values. Incrementing the counter by one may, of course, involve allowing a predefined time to pass before acquiring new parameter values.

Figure 5:
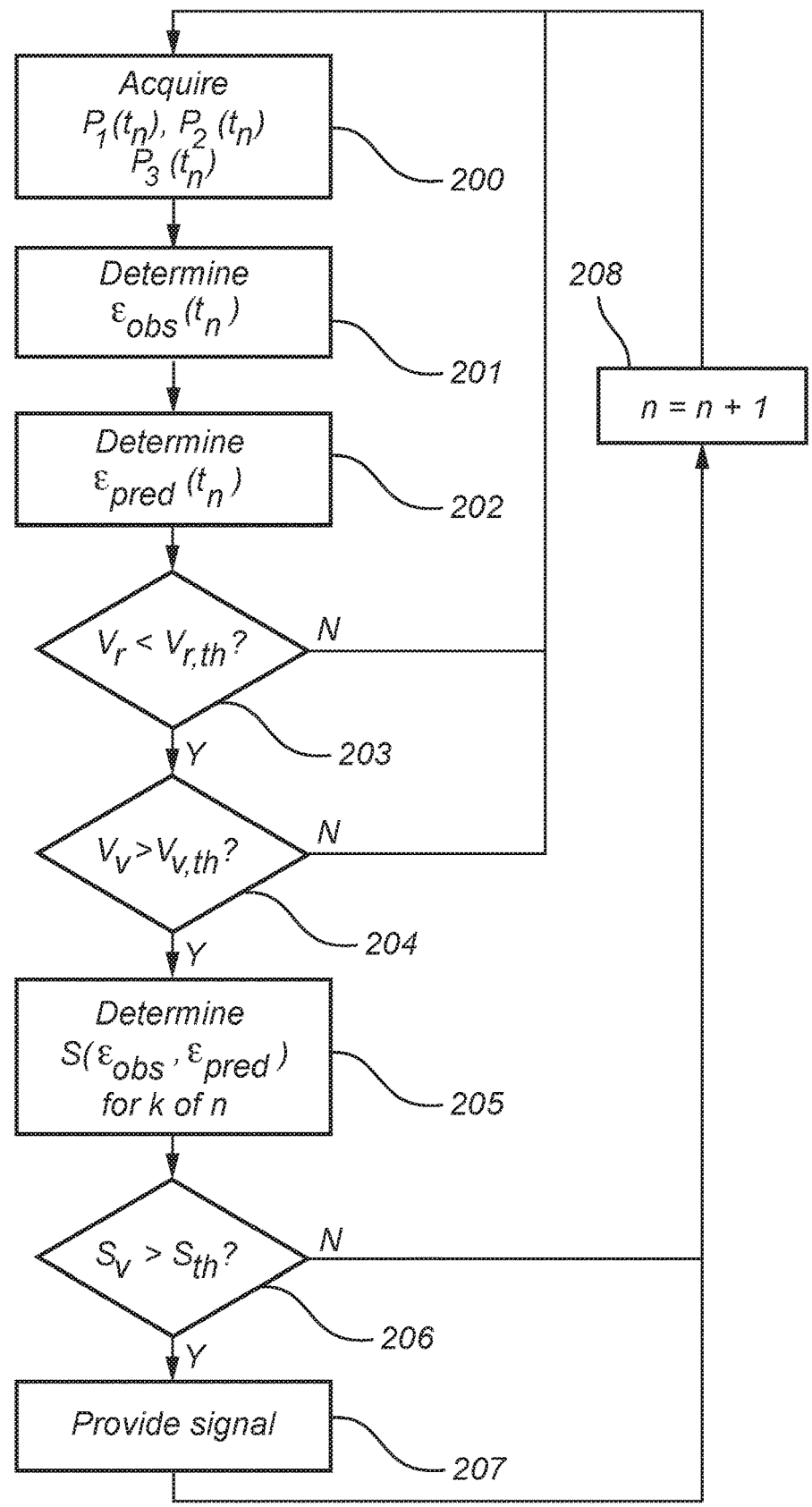
FIG. 5 is a flow-chart illustrating a method according to a second example embodiment.

FIG. 5 is a flow-chart illustrating a method according to a second example embodiment. In the method in FIG. 5, steps 200-202 may be the same as steps 100-102 described above. In the subsequent step 203, the speed vr of the steering rod 19, monitored by the steering system monitoring unit 21 as is schematically indicated in FIG. 3, may be compared with a predefined threshold rod speed vr, th.

When it is determined that the speed vr of the steering rod 19 is higher than the threshold rod speed vr, th, the determination of the observed strain $\varepsilon obs(tn)$ may be considered to be unreliable, and the method therefore returns to the first step 200 to acquire a new set of vehicle parameter values.

When it is determined that the speed vr of the steering rod 19 is lower than the threshold rod speed vr, th, the method proceeds to step 204, where it is evaluated if the vehicle speed vv is lower or higher than a predefined threshold vehicle speed vv, th.

When the vehicle speed vv is lower than the predefined threshold vehicle speed vv, th., the determination of the observed strain $\varepsilon obs(tn)$ may be considered to be unreliable, and the method therefore returns to the first step 200 to acquire a new set of vehicle parameter values.

When the vehicle speed vv is higher than the predefined threshold vehicle speed vv, th., the method is allowed to proceed to step 205, where a value of the status parameter $S(\varepsilon obs, \varepsilon pred)$ is determined as described for step 103 above.

The value of the status parameter is evaluated in step 206, as described above for the first example embodiment in FIG. 4, and when it is determined that the functional status of the steering system 11 has been degraded, a signal indicative thereof is provided in step 207.

The counter n may then be incremented by one in step 208, before the method returns to the first step 200 to acquire a new set of vehicle parameter values.

In summary, the disclosure thus relates to a method including the steps of: acquiring a time sequence of sets of vehicle parameter values; determining, for each set of acquired vehicle parameter values, based the set of acquired vehicle parameter values, a measure indicative of an observed strain in a steering rod, between a steering actuator and a wheel; determining, for each set of acquired vehicle parameter values, a measure indicative of a predicted strain in the rod, between the steering actuator and the wheel; and determining the functional status of the steering system based on a relation between the measures indicative of the observed strain in the rod and the measures indicative of the predicted strain in the rod.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:
1. A method comprising:
acquiring a time sequence of sets of vehicle parameter values, each set of vehicle parameter values including:
a first parameter value indicative of a desired change in a direction of travel of the vehicle;
a second parameter value indicative of a vehicle speed; and
a third parameter value indicative of an actuation force currently applied by a steering actuator of a steering system to a rod of the steering system;

determining, for each set of vehicle parameter values from the time sequence of sets of vehicle parameter values, based on the first parameter value, the second parameter value and the third parameter value, an observed strain in a portion of the rod positioned between the steering actuator and a wheel of the vehicle, as a time sequence of observed strain values in the rod;

determining, for each set of vehicle parameter values from the time sequence of sets of vehicle parameter values, based on the first parameter value and the second parameter value in each set of vehicle parameter values, and a set of previously determined strain values for different values of the first parameter and the second parameter, a predicted strain in the portion of the rod positioned between the steering actuator and the wheel, as a time sequence of predicted strain values in the rod;

determining a functional status of the steering system based on a comparison over time of the time sequence of observed strain values in the rod and the time sequence of predicted strain values in the rod;

determining whether the functional status indicates a degraded functional status of the steering system; and responsive to determining that the functional status indicates the degraded functional status of the steering system, switching, by an autonomous drive controller of the vehicle, the vehicle from operating in an autonomous drive mode to operating in a manual drive mode.

2. The method according to claim 1, wherein the method further comprises providing a status signal indicating the determined functional status of the steering system.

3. The method according to claim 2,
wherein determining the functional status of the steering system includes determining a cumulative deviation over time between the observed strain in the rod and the predicted strain in the rod, and
wherein the status signal indicates a degraded functional status of the steering system, when the determined deviation is greater than a predefined threshold deviation.

4. The method according to claim 1, wherein the vehicle is a first vehicle, wherein the set of previously determined strain values includes values acquired in connection with previous measurements on a second vehicle that is different from the first vehicle and shares a same configuration with the first vehicle, the second vehicle having a steering system with a predetermined functional status.

5. The method according to claim 4, the previous measurements involving using a sensor for measuring a parameter directly related to strain in the portion of the rod positioned between steering actuator and wheel.

6. The method according to claim 1, wherein acquiring the time sequence of the sets of vehicle parameter values comprises receiving, at a server device, the time sequence of the sets of vehicle parameter values, the method further comprising:
sending, by the server device, the functional status determined with respect to the steering system to the vehicle.

7. The method according to claim 1, wherein determining the functional status of the steering system includes classifying values in the time sequence observed strain values in the rod into one or more predefined functional status categories.

8. The method according to claim 1, further comprising monitoring a speed of movement of the rod, wherein determining the functional status of the steering system comprises determining the functional status of the steering system only when the speed of movement of the rod is slower than a predefined threshold speed.

9. The method according to claim 1,
wherein determining the functional status of the steering system comprises determining the functional status of the steering system only when the vehicle is operating in the autonomous driving mode.

10. The method according to claim 1, wherein determining the functional status of the steering system comprises determining the functional status of the steering system only when the speed of the vehicle is greater than a predefined threshold speed.

11. A steering system monitoring unit comprising:
processing circuitry configured to monitor a functional status of a steering system including a rod coupled to a wheel and being arranged to turn the wheel under control of a steering actuator operable to apply an actuation force to the rod by at least being configured to:
acquire a time sequence of sets of vehicle parameter values, each set of vehicle parameter values including a first parameter value indicative of a desired change in a direction of travel of the vehicle, a second parameter value indicative of a vehicle speed, and a third parameter value indicative of the actuation force currently applied by the steering actuator to the rod;
determine, for each set of vehicle parameter values from the time sequence of sets of vehicle parameter values, based on first parameter value, the second parameter value and the third parameter value, an observed strain in a portion of the rod positioned between the steering actuator and the wheel, as a time sequence of observed strain values in the rod;
determine, for each set of vehicle parameter values from the time sequence of sets of vehicle parameter values, based on the first parameter value and the second parameter value in each set of vehicle parameter values, and a set of previously determined strain values for different values of the first parameter and the second parameter, a predicted strain in the portion of the rod positioned between the steering actuator and the wheel, as a time sequence of predicted strain values in the rod;
determine the functional status of the steering system based on a comparison over time of the time sequence of observed strain values in the rod and the time sequence of predicted strain values in the rod;
determine whether the functional status indicates a degraded functional status of the steering system; and
responsive to determining that the functional status indicates a degraded functional status of the steering system cause an autonomous drive controller of the vehicle to switch the vehicle from operating in an autonomous drive mode to operating in a manual drive mode.

12. The steering system monitoring unit according to claim 11, wherein the steering system monitoring unit is implemented in a server device further comprising communications hardware configured to send, to the vehicle, the functional status determined with respect to the steering system.

13. The steering system monitoring unit according to claim 11, wherein to determine the functional state of the steering system, the steering system monitoring unit is configured to determine the functional state only when the speed of the vehicle is greater than a predefined threshold speed.

14. A vehicle comprising:
- a steering system including a wheel, and a rod coupled to the wheel and arranged to turn the wheel under control of a steering actuator operable to apply an actuation force to the rod;
- a steering system monitoring unit configured to:
  - acquire a time sequence of sets of vehicle parameter values, each set of vehicle parameter values including a first parameter value indicative of a desired change in a direction of travel of the vehicle, a second parameter value indicative of a vehicle speed, and a third parameter value indicative of the actuation force currently applied by the steering actuator to the rod;
  - determine, for each set of vehicle parameter values from the time sequence of sets of vehicle parameter values, based on first parameter value, the second parameter value and the third parameter value, an observed strain in a portion of the rod positioned between the steering actuator and the wheel, as a time sequence of observed strain values in the rod;
  - determine, for each set of vehicle parameter values from the time sequence of sets of vehicle parameter values, based on the first parameter value and the second parameter value in each set of vehicle parameter values, and a set of previously determined strain values for different values of the first parameter and the second parameter, a predicted strain in the portion of the rod positioned between the steering actuator and the wheel, as a time sequence of predicted strain values in the rod;
  - determine a functional status of the steering system based on a comparison over time of the time sequence of observed strain values in the rod and the time sequence of predicted strain values in the rod;
  - determine whether the functional status indicates a degraded functional status of the steering system; and
- an autonomous drive controller configured to, responsive to the steering system monitoring unit determining that the functional status indicates the degraded functional status of the steering system, switch the vehicle from operating in an autonomous drive mode to operating in a manual drive mode.

15. The vehicle according to claim 14, wherein the steering system monitoring unit is implemented in a server device further comprising communications hardware configured to send, to the vehicle, the functional status determined with respect to the steering system.

16. The vehicle according to claim 14, wherein to determine the functional state of the steering system, the steering system monitoring unit is configured to determine the functional state only when the speed of the vehicle is greater than a predefined threshold speed.

17. The vehicle according to claim 14, wherein the steering system monitoring unit is further configured to provide a status signal indicating the determined functional status of the steering system.

18. The vehicle according to claim 14, wherein the vehicle comprises a first vehicle, and wherein the set of previously determined strain values includes values acquired in connection with previous measurements on a second vehicle that is different from the first vehicle and shares a same configuration with the first vehicle, the second vehicle having a steering system with a predetermined functional status.

19. The vehicle according to claim 18, wherein the previous measurements involve using a sensor for measuring a parameter directly related to strain in the portion of the rod positioned between the steering actuator and the wheel.

20. The vehicle according to claim 14, wherein the steering system monitoring unit is configured to determine a speed of movement of the rod, and wherein to determine the functional state of the steering system, the steering system monitoring unit is configured to determine the functional state only when the speed of movement of the rod is slower than a predefined threshold speed.

* * * * *